United States Patent [19]

Shimano et al.

[11] 4,229,392

[45] Oct. 21, 1980

[54] PROCESS OF PRODUCING A FOAMED PLASTIC INSULATED CONDUCTOR AND AN APPARATUS THEREFOR

[75] Inventors: Takashi Shimano; Yoshimasa Masukata; Hiromitsu Sato, all of Ichihara, Japan

[73] Assignee: The Furukawa Electric Co., Ltd., Tokyo, Japan

[21] Appl. No.: 13,215

[22] Filed: Feb. 21, 1979

[30] Foreign Application Priority Data

Feb. 28, 1978 [JP] Japan ................................ 53/22551

[51] Int. Cl.² ............................................ B29D 27/00
[52] U.S. Cl. ................... 264/40.1; 264/40.2; 264/45.9; 264/50; 264/174; 425/162
[58] Field of Search ............ 264/45.9, 46.1, 40.1, 264/40.2, 23, 50, 174; 425/4 C, 135, 162

[56] References Cited

U.S. PATENT DOCUMENTS

| | | | |
|---|---|---|---|
| 2,820,987 | 1/1958 | Bunch | 264/45.9 X |
| 2,928,130 | 3/1960 | Gray | 264/45.9 X |
| 3,914,357 | 10/1975 | Cereijo et al. | 264/45.9 X |
| 3,968,463 | 7/1976 | Boysen | 264/46.1 X |
| 3,972,970 | 8/1976 | Taylor | 264/50 X |
| 3,975,473 | 8/1976 | Mulvaney | 264/23 |
| 3,981,649 | 9/1976 | Shimano et al | 425/4 C |
| 4,137,754 | 2/1979 | Colombo et al. | 264/40.1 X |

FOREIGN PATENT DOCUMENTS

| | | |
|---|---|---|
| 48-11871 | 4/1973 | Japan . |
| 51-53569 | 5/1976 | Japan . |
| 51-60978 | 5/1976 | Japan . |
| 52-9837 | 3/1977 | Japan . |

Primary Examiner—Philip Anderson
Attorney, Agent, or Firm—Pearne, Gordon, Sessions

[57] ABSTRACT

This invention relates to a process of producing a foamed plastic insulated conductor. This process comprises the steps of forming a foamed insulation on a conductor wire by means of a gas injecting extruder and passing said conductor wire having said foamed insulation through telescopic cooling trough means including a movable trough to be adjusted in its position relative to a head of said gas injecting extruder so as to obtain a given value of a capacitance of the foamed plastic insulated conductor in accordance with an electrical signal from a capacitance monitor to detect a value of said capacitance of the foamed plastic insulated conductor. The process of the invention is characterized by further comprising the steps of detecting the position of the movable trough adjacent to its critical or limit positions and adjusting the injection rate of the foaming gas so as to move the movable trough to the middle position of the range of movement thereof.

This invention also relates to an apparatus for effecting the above-mentioned process.

8 Claims, 5 Drawing Figures

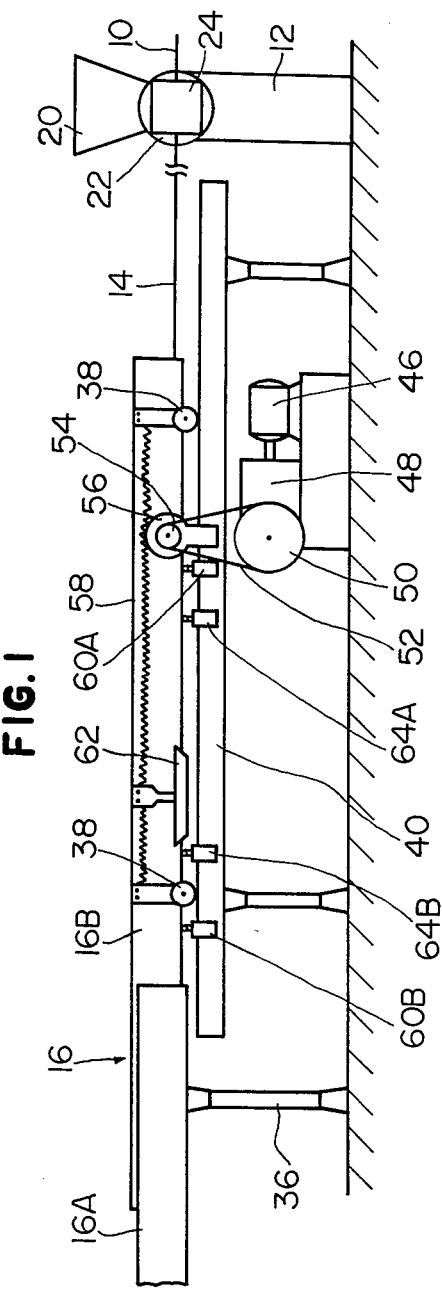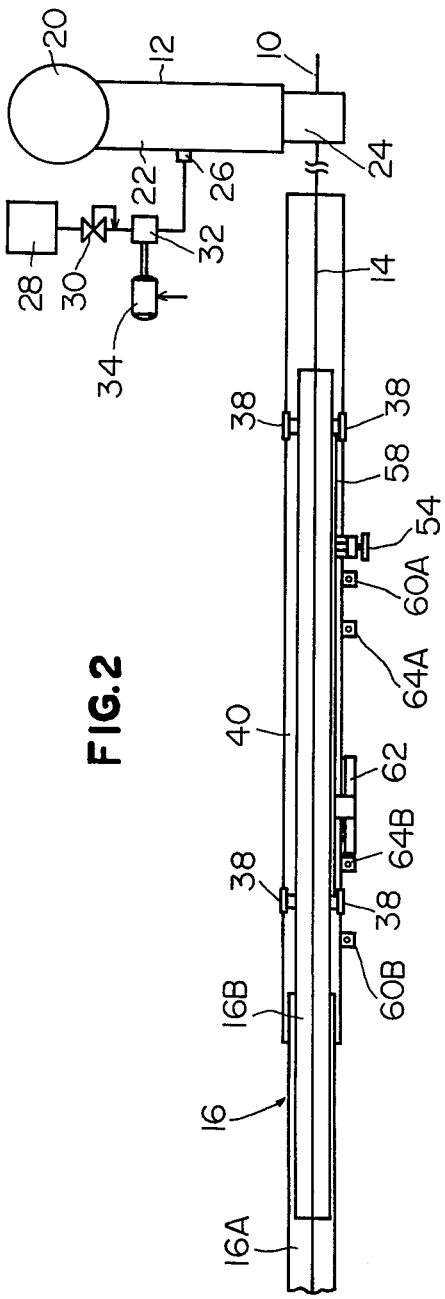

PROCESS OF PRODUCING A FOAMED PLASTIC INSULATED CONDUCTOR AND AN APPARATUS THEREFOR

BACKGROUND OF THE INVENTION

A foamed plastic insulated conductor such as an insulated element wire for a communication cable or an insulated core for a coaxial cable has been produced by extruding a foamed resin insulation on a conductor wire travelling through a crosshead of a gas injecting extruder. Of course, it is required that a capacitance of the foamed plastic insulated conductor is required to be generally uniform throughout its length.

In order to maintain the uniform capacitance of the foamed plastic insulated conductor, a process has been tried in which a conductor wire having a foaming agent containing insulation extruded thereon through the crosshead of the gas injecting extruder passes through cooling trough means including a trough movable axially of the insulated electric conductor toward and away from the crosshead. A capacitance monitor is provided which serves to detect a value of the capacitance of the foamed plastic insulated conductor cooled by the cooling trough means. If there is a difference between a detected value and a specified or given one of the capacitance, the movable trough is adjusted in its position to eliminate the difference in the capacitance (see Japanese Patent Application Publication No. 11,871/1973). More particularly, the capacitance of the foamed plastic insulated conductor corresponds to the expansion rate of the insulation on the conductor wire. Thus, if the detected value of the capacitance of the foamed insulated conductor is much higher than the given one of the capacitance (or if the expansion rate of the foamed insulation on the conductor wire is much lower than a given one thereof), then the movable trough is adjusted in its position so as to move away from the crosshead of the extruder. Accordingly, it takes more time to introduce the foamed plastic insulated conductor extruded out of the crosshead of the extruder, into the cooling trough means, which causes the expansion rate of the foamed insulation on the conductor wire to become higher. If the detected value of the capacitance of the foamed plastic insulated conductor is much lower than the given one thereof (or if the expansion rate of the foamed insulation is much higher), then the movable trough is adjusted in its position in a reverse manner.

The disadvantage of such a process is that the range of movement of the movable trough is limited. Thus, the capacitance of the foamed plastic insulated conductor cannot be controlled beyond the limited range of movement of the trough. In such a case, hitherto, an operator has controlled an extruder temperature or the rate of travelling the conductor wire so that the given value of the capacitance of the foamed plastic insulated conductor can be obtained. However, it disadvantageously requires a higher skill and a troublesome operation.

Another process has been proposed which is adapted to automatically control an extruder temperature in accordance with the position of the movable trough (see Japanese Patent Application Publication No. 9,837/1977). However, the heat capacity of the extruder is too large to quickly adjust the extruder temperature in accordance with the change in position of the movable trough.

Lately, there are proposed processes of producing a foamed plastic insulated conductor by extruding a resin insulation on a conductor wire while a gas as a foaming agent is being injected into a molten resin in a gas injecting extruder (see Japanese Patent Application Laying Open Gazette Nos. 53,569/1976 and 60,978/1976). In these processes, there is employed a system for controlling a capacitance of the foamed plastic insulated conductor by means of a combination of a movable trough and a capacitance monitor which are substantially identical to those in the aforementioned prior arts. In this case, since it is also possible to control the expansion rate of the foamed insulation on the conductor wire by regulating the injection rate of the foaming gas at the limit positions of the movable trough where the capacitance of the foamed plastic insulated conductor can be no longer controlled, an operator must adjust the quantity of the foaming gas injected into the extruder. However, this also disadvantageously requires a high skill of adjustment of the gas injection and a troublesome operation. In addition thereto, the adjustment of gas injection after stopping of the movable trough is not preferable because that portion of the foamed plastic insulated conductor produced after the adjustment of gas injection until the molten resin containing a predetermined amount of gas through the adjustment of gas injection reaches the outlet of the crosshead, may have defective capacitance.

SUMMARY OF THE INVENTION

Accordingly, it is a principal object of the invention to provide a process of producing a foamed plastic insulated conductor which has a uniform capacitance corresponding to the expansion rate of the foamed insulation on the conductor.

It is another object of the invention to provide an apparatus for producing foamed plastic insulated conductor which has a uniform capacitance corresponding to the expansion rate of the foamed insulation on the conductor.

In accordance with one aspect of the invention, there is provided a process of producing a foamed plastic insulated conductor comprising the steps of injecting a foaming gas into a molten resin in an extruder; extruding an insulation of said molten resin on a conductor wire travelling through a head of said extruder, said insulation extruded out of said head being foamed to foam a foamed plastic insulated conductor; passing said foamed plastic insulated conductor through cooling trough means including a movable trough which is movable axially of said foamed plastic insulated conductor toward and away from said head of said extruder; detecting a value of a capacitance of said foamed plastic insulated conductor by means of a capacitance monitor; and when there is a difference between the detected value and the given one of said capacitance of said foamed plastic insulated conductor, adjusting the position of said movable trough so as to correct said detected value of said capacitance to said given one thereof, characterized by further comprising the steps of detecting the positions of said movable trough adjacent to limit positions thereof; and adjusting the injection rate of said foaming gas so as to return said movable trough to the middle portion of the range of movement thereof.

In accordance with another aspect of the invention, there is provided an apparatus for producing a foamed plastic insulated conductor comprising a gas injecting extruder to extrude a foamed resin insulation on a conductor wire travelling through a head thereof so as to cover said conductor wire with said foamed resin insulation; a gas flow rate regulator to determine a flow rate of a foaming gas to be injected into a molten resin in said gas injecting extruder; cooling trough means to cool said foamed insulation on said conductor wire, said cooling trough means including a movable trough which is movable axially of said foamed plastic insulated conductor toward and away from said head of said gas injecting extruder; a capacitance monitor to detect a value of a capacitance of said cooled and foamed plastic insulated conductor to be compared with a given value thereof; and trough position adjusting means to adjust the position of said movable trough so as to eliminate a difference between said detected value and said given one of said capacitance of said foamed plastic insulated conductor, characterized by further comprising trough position detecting means to electrically detect the positions of said movable trough adjacent to limit positions of movement thereof; a gas flow rate regulator adjusting means to adjust said flow rate of said foaming gas to another value in accordance with an electrical signal from said trough position detecting means; and timer means to stop the adjustment of said gas flow rate regulator for a setting time after the adjustment of said gas flow rate regulator is completed.

BRIEF DESCRIPTION OF THE DRAWINGS

The above and other objects of the invention will be apparent from the description of the embodiments taken with reference to the accompanying drawings in which;

FIG. 1 is a schematic and side elevational view of an apparatus constructed in accordance with the invention;

FIG. 2 is a plan view of the apparatus of FIG. 1;

DETAILED DESCRIPTION OF THE EMBODIMENTS

Figure 3:
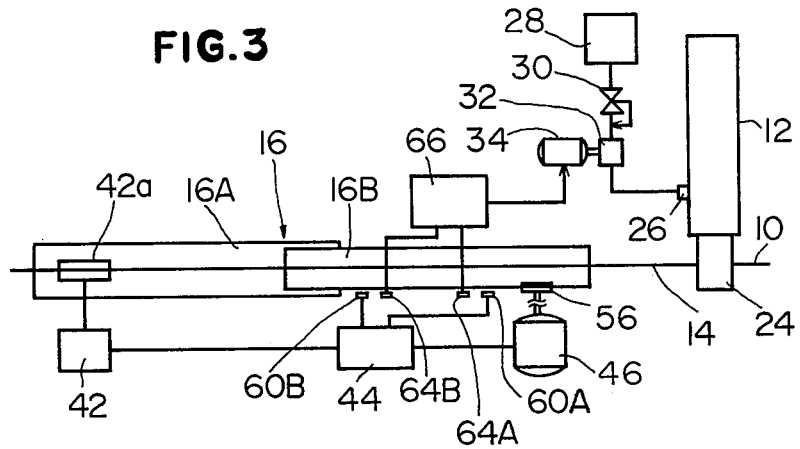
FIG. 3 is a schematic diagram of a capacitance controlling system used in the apparatus of the invention.

FIGS. 1 and 2 show an embodiment of an apparatus constructed in accordance with the invention and adapted to effect a process of the invention.

A conductor wire 10 travels through a gas injecting extruder 12 so that resin insulation is extruded thereon and foamed when led out of the extruder, and then passes through cooling trough means 16 of telescopic type to produce a foamed plastic insulated conductor 14.

The extruder 12 comprises a hopper 20 to contain thermoplastic resin material in the form of pellet or powder therein, a barrel 22 including a not shown screw to feed thermoplastic resin material while heating it to be melted, and a crosshead 24 through which the conductor wire 10 travels so as to extrude a resin insulation thereon.

A gas injection port 26 is provided in a middle portion of the barrel 22. A gas as a foaming agent is injected into the molten resin fed through the barrel 22. The gas may be fed from a high pressure gas source such as a gas cylinder or a gas compressor 28 through a secondary pressure regulating valve 30 and then through a gas flow rate regulator 32.

In order to maintain a uniform capacitance of the foamed plastic insulated conductor, it is required to stabilize the expansion rate of the foamed insulation on the conductor wire 10. To this end, the constant gas injection rate should be maintained in spite of variation in the pressure of the molten resin in the barrel 22. This is effectively accomplished by maintaining a sonic or generally sonic velocity of the foaming gas passing through the gas flow rate regulator 32. This is because a pressure upstream of the gas flow rate regulator 32 which is sufficiently higher than the pressure of the molten resin in the barrel 22 of the extruder 12 causes the sonic velocity of the foaming gas through the gas flow rate regulator 32, and no higher velocity of the foaming gas is caused thereby. In such condition, the flow rate of the gas through the gas flow rate regulator 32 is determined only by the degree of opening of the gas flow rate regulator 32 and the upstream pressure thereof in spite of variation in the pressure of the molten resin in the barrel 22. In the illustrated embodiment, the flow rate of the foaming gas through the gas flow rate regulator 32 is regulated by adjusting the degree of opening of the gas flow rate regulator 32 by means of a pulse motor 34 while the pressure upstream of the gas flow rate regulator 32 is maintained at a sufficiently high value of a predetermined degree. A control of the degree of opening of the gas flow rate regulator 32 by means of the pulse motor 34 will be described later in detail.

Thermoplastic resin material from the hopper 20 of the extruder 12 is melted and fully mixed with the gas fed through the gas injection port 26, while being fed by the screw in the barrel. Thereafter, the gas containing molten resin reaches the crosshead 24 of the extruder 12, is extruded on the conductor wire 10 travelling through the crosshead 24 of the extruder 12 at a constant rate, and expanded when it is led out of a die of the crosshead 24.

The expanded or foamed insulation together with the conductor wire 10 then passes through the telescopic cooling trough means 16 and thereafter is wound by a not shown take up apparatus.

The telescopic cooling trough means 16 comprises a stationary trough 16A supported on a floor by legs 36, only one of which is shown in FIG. 1 and a movable trough 16B securely mounted on the stationary trough 16A so as to be movable axially of the foamed plastic insulated conductor 14 toward and away from the crosshead 24 of the extruder 12. The movable trough 16B is provided on its both sides with wheels 38 which engage a cooling water receiver 40 at its edges so as to move the movable trough 16B.

This movable trough 16B serves to control the capacitance of the foamed plastic insulated conductor 14 so as to become uniform. More particularly, if the movable trough 16B moves toward the crosshead 24 of the extruder 12, then the period during which the foamed plastic insulated conductor 14 extruded from the crosshead 24 reaches an inlet of the movable trough 16B (during which the expansion of the insulation on the conductor wire 10 proceeds), becomes shorter, which causes the expansion rate of the insulation to be lower. Reversely, if the movable trough 16B moves away from the crosshead 24 of the extruder 12, then the above period becomes longer, which causes the expansion rate of the insulation to be higher. Thus, the movable trough 16B can be adjusted in its position in accordance with the degree of expansion of the insulation on the conductor wire 10, so as to maintain the given value of the expansion rate or capacitance of the foamed plastic insulated conductor 14.

Trough position adjusting means comprises a capacitance monitor 42, a servo motor 46 and a servo motor control 44 as known in the prior art. As shown in FIG. 3, the capacitance monitor 42 includes a detecting electrode 42a disposed within the stationary trough 16A so that the foamed plastic insulated electric conductor 14 can pass through the electrode 42a. This monitor 42 serves to electrically detect the capacitance of the cooled and foamed plastic insulated conductor 14 and to output an electrical signal which corresponds to the difference between the detected and given values of the capacitance, if any.

The servo motor control 44 serves to output a motor driving signal in accordance with the input signal from the capacitance monitor 42 so as to control the rotating direction and the rotary angle of the servo motor 46.

As shown in FIG. 1, the rotation of the servo motor 46 is transmitted through a reduction gear 48, a sprocket 50 connected to the reduction gear 48, a chain 52, a sprocket 54 and a pinion 56 connected to the sprocket 54, the chain 52 being engaged between and with the sprockets 50 and 54, to a rack 58 securely mounted on one of the side walls of the movable trough 16B whereby it can move axially of the foamed plastic insulated conductor 14.

In order to stop the movement of the movable trough 16B at the critical or limit positions of its range of movement, first trough position detectors such as limit switches 60A and 60B are provided on one of the side walls of the cooling water receiver 40 as shown in FIGS. 1 and 2, and an operating member 62 is mounted on the movable trough 16B for operating the limit switches 60A and 60B as shown in FIG. 2. At either of the limit positions of the movable trough 16B, the operating member 62 operates the corresponding limit switch 60A or 60B which permits an electrical signal to be input to the servo motor control 44 whereby the servo motor 46 stops rotating.

In order to further control the capacitance of the foamed plastic insulated conductor 14 at the limit positions of the movable trough 16B, there are provided second trough position detectors such as limit switches 64A and 64B which are disposed inside of and spaced adjacent to the limit switches 60A and 60B to detect the positions near the limit positions of the movable trough 16B. The operating member 62 operates either of the limit switches 64A and 64B, which permits an electrical signal to be an input to a pulse motor control 66 whereby a pulse motor 34 is rotated so as to adjust a flow rate of the foaming gas through the gas flow rate regulator 32.

Figure 4:
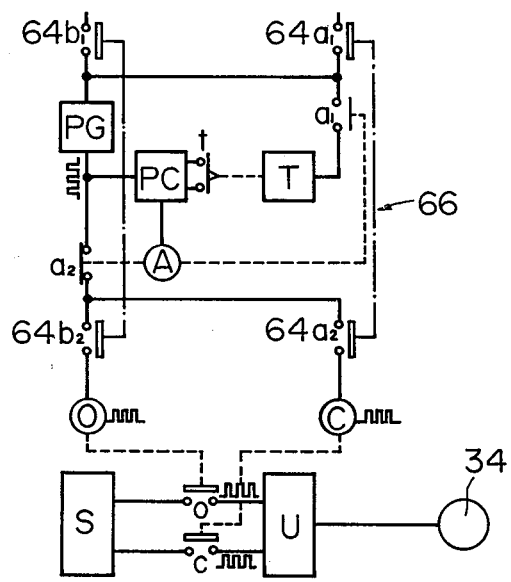
FIG. 4 is a schematic diagram of a pulse motor control used in the apparatus of the invention.

FIG. 4 shows the pulse motor control 66 in detail. The control 66 may comprise a pulse generator PG, a preset pulse counter PC and a timer T. A relay coil A, pulse motor controlling relay coils O and C are also provided in the control 66. The pulse motor 34 is driven by an electric power source S through a driving unit U. In FIG. 4, numerals $64a_1$, $64a_2$, $64b_1$ and $64b_2$ designate normally open contacts of the respective limit switches 64A and 64B, numeral $a_1$ a normally open contact of the relay coil A, numeral $a_2$ a normally closed contact of the relay coil A, numerals o and c normally open contacts of the respective relay coils O and C, and numeral t a normally closed contact of the timer T. The contacts o and c are disposed between the electric power source S and the driving unit U as shown in FIG. 4.

In operation, when the operating member 62 on the movable trough 16B which moves toward the crosshead 24 of the extruder 12 operates the limit switch 64A as the second trough position detector, the contacts $64a_1$ and $64a_2$ are closed so that the pulse generator PG is operated to output pulse signals having a predetermined period. These pulse signals energize the relay coil C to intermittently close its contact c. Accordingly, the pulse motor 34 is driven at the angle corresponding to the number of the pulses in the direction in which the gas flow rate regulator 32 is closed. The rotary angle of the pulse motor 34 is determined by the preset pulse counter PC. For example, if the pulse motor 34 is intended to be rotated at the given angle corresponding to three pulses for every adjustment thereof, the pulse counter PC is set so as to output a stopping signal when it counts three pulses. The stopping signal energizes the relay coil A to open its contact $a_2$, which causes the relay coil C to be deenergized so as to stop rotation of the pulse motor 34. The normally open contact $a_1$ of the relay coil A is closed by the energization of the relay coil A so as to initiate the operation of the timer T. When a setting time of the timer T elapses, its normally open contact t is momentarily closed so as to reset the preset pulse counter PC to the original position "O". Thereby, the relay coil A is deenergized to return the contacts $a_1$ and $a_2$ to their original positions.

At that time, if the contacts $64a_1$ and $64a_2$ of the limit switch 64A are open, the pulse generator PG remains stopped so as to no longer rotate the pulse motor 34. If the contacts $64a_1$ and $64a_2$ of the limit switch 64A remain closed, the aforementioned operation is repeated so as to rotate the pulse motor 34 in the direction in which the gas flow rate regulator 32 is moved a further given angle toward closed.

When the operating member 62 on the movable trough 16B which moves away from the crosshead 24 of the extruder 12 operates the limit switch 64B as the second position detector, the contacts $64b_1$ and $64b_2$ are closed. Thus, in the manner substantially identical to that of the above case, the relay coil O is energized to intermittently close its contact o. Accordingly, the pulse motor 34 is driven at the angle corresponding to the number of the pulses in the direction in which the gas flow rate regulator 32 is opened. The operations of the preset pulse counter PC and the timer T are substantially identical to those in the above case.

The setting time of the timer T is based on the period from the time when the gas flow rate of the gas flow rate regulator 32 is adjusted by the operation of the limit switch 64A or 64B, to the time when the adjustment of the expansion rate of the insulation on the conductor wire 10 appears. More particularly, as soon as the gas flow rate of the regulator 32 is adjusted to a new selected value, the expansion rate of the insulation on the conductor wire 10 cannot vary immediately, but it can vary only after much time. This period corresponds to the period during which the molten resin located adjacent to the gas injection port 26 when the gas flow rate is adjusted reaches the position at which the electrode 42a of the capacitance monitor 42 is located. The period P may be expressed by;

$$P \doteqdot \frac{\text{Inside volume of the extruder from the position of the gas injection port to the outlet of the crosshead}}{\text{Extruding quantity per unit time}}$$

wherein the resin extruding quantity from the outlet of the crosshead of the extruder to the position at which the electrode of the capacitance monitor is located is negligible relative to the quantity inside the extruder.

Whether the adjustment of the gas flow rate is correct can be appreciated only after the period P lapses. Thus, the setting time is determined so as to be somewhat longer than the period P. Supposing the inner diameter of the barrel is 65 mm and the ratio of the length to the diameter of the barrel is 30, for example, the setting time is about 7 minutes when the screw in the barrel 22 rotates at a revolution of 20 to 30 per minute and about 5 minutes when it rotates at a revolution of 30 to 40 per minute.

If one adjustment of the gas flow rate is sufficient to obtain the given value of the capacitance after the setting time of the timer T lapses, the movable trough 16B moves toward the middle position of movement thereof. Thus, the limit switch 64A or 64B is released from the operating member 62 on the movable trough 16B while the adjusted gas flow rate is maintained. If one adjustment of the gas flow rate is insufficient to obtain the given value of the capacitance even after the setting time of the timer T elapses, the movable trough 16B does not move toward the middle position movement thereof and the limit switch 64A or 64B remains operated by the operating member 62 on the movable trough 16B. Thus, the rotating angle of the pulse motor 34 and as a result, the gas injection or flow rate is adjusted in the manner as aforementioned.

In this case, during the setting time of the timer T, the movable trough 16B continues to move. Therefore, the movable trough 16B should be prevented from reaching such limit positions. It will be noted that the positions of the limit switches 64A and 64B should be determined so as to avoid this. More particularly, the distances between the limit switches 60A and 64A and between the limit switches 60B and 64B are required to be much larger than the distance at which the movable trough 16B moves during the setting time of the timer T at a normal velocity of the movable trough 16B. The normal velocity does not mean a velocity at which the movable trough 16B moves reciprocatively for a shorter time, but it means an average velocity at which it gradually approaches the limit positions while its reciprocative movement is repeated. Such a normal velocity may be of the order of a few centimeters per hour.

In this manner, supposing the setting time of the timer T is a few minutes as aforementioned, the distance through which the movable trough 16B moves during the setting time is a few milimeters per minute, and therefore, the distances between the limit switches 60A and 64A and between the limit switches 60B and 64B may range from a few to ten and a few centimeters.

Such gradual movement of the movable trough 16B at the average velocity toward the limit positions is considered to be caused by variation in atmospheric temperature or unevenness in distribution of materials and so on. For example, as atmospheric temperature varies, the temperature of the extruder may slowly vary because it has a large heat capacity even though its heat may be controlled. Therefore, the molten resin in the extruder varies in its temperature so as to change the expansion rate of the foamed insulation on the conductor wire, which causes the movable trough 16B to be moved. In case of replacement of material's color or by error in material's distribution, the velocity at which the movable trough 16B moves becomes higher. Thus, the distances between the limit switches are preferably much larger in order to prepare for such causes.

Although, in the illustrated embodiment, the gas flow rate is set by the combination of the gas flow rate regulator 32 which regulates the gas flow rate by adjusting the degree of opening thereof and the secondary pressure self-regulating valve 30 which serves to maintain a constant upstream pressure, the adjustment of the gas flow or injection rate can be effected by gas flow rate regulators of other type.

Figure 5:
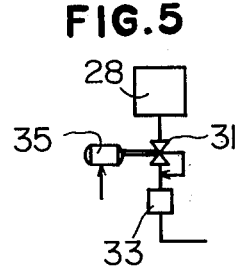
FIG. 5 is a schematic view of another embodiment of the invention.

FIG. 5 shows one of such gas flow rate regulators. This gas flow rate regulator 33 comprises an orifice having a constant degree of opening thereof. A secondary pressure regulating valve 31 serves to maintain a variable pressure upstream of the gas flow rate regulator 33. A high pressure gas of sonic or generally sonic velocity is supplied through the secondary pressure regulating valve 31 to the gas flow rate regulator 33. A pulse motor 35 serves to operate the secondary pressure regulating valve so as to adjust the secondary pressure thereof. The system as shown in FIG. 4 may be used for controlling the pulse motor 35. In this embodiment, the gas flow rate can be regulated by adjusting the upstream pressure of the gas flow rate regulator 33 by means of the secondary pressure regulating valve 31 while the constant degree of opening of the orifice is maintained.

It will be noted that the limit switches 60A, 60B, 64A and 64B may be replaced by other trough position detectors such as proximity switches.

Although some embodiments of the invention have been described and illustrated with reference to the accompanying drawings, it will be understood by those skilled in the art that they are by way of example, and that various changes and modifications may be made without departing the spirit and scope of the invention, which is intended to be defined only to the appended claims.

What is claimed is:

1. A process of producing a foamed plastic insulated conductor comprising the steps of injecting a foaming gas into a molten resin in an extruder; extruding an insulation of said molten resin on a conductor wire travelling through a head of said extruder, said insulation extruded out of said head being foamed to form a foamed plastic insulated conductor; passing said foamed plastic insulated conductor through cooling trough means including a movable trough which is movable axially of said foamed plastic insulated conductor toward and away from said head of said extruder in a range of movement between first and second limit positions; detecting a value of a capacitance of said foamed plastic insulated conductor by means of a capacitance monitor; and when there is a difference between the detected value and the specified capacitance for said foamed plastic insulated conductor, adjusting the position of said movable trough so as to correct said detected value of said capacitance to that of said specified capacitance thereof, characterized by further comprising the steps of detecting the positions of said movable trough adjacent to the limit positions thereof; adjusting the injection rate of said foaming gas to a selected value so as to return said movable trough toward the middle portion of the range of movement thereof; said rate adjusting step being effected at every selected value thereof, and wherein after adjusting the injection rate of said foaming gas to a selected value, the selected value of the injection rate is retained for a given time period.

2. A process of producing a foamed plastic insulated conductor as set forth in claim 1, wherein said given time period is longer than the period during which said molten resin adjacent to a gas injection port of said extruder reaches the position at which an electrode of said capacitance monitor is located.

3. A process of producing a foamed plastic insulated conductor as set forth in claim 1 or 2, wherein adjusting the injection rate of said foaming gas is effected by regulating a degree of opening of a gas flow rate regulator while a constant pressure upstream of said gas flow rate regulator is maintained.

4. A process of producing a foamed plastic insulated conductor as set forth in claim 1 or 3, wherein adjusting the injection rate of said foaming gas is effected by regulating a pressure upstream of a gas flow rate regulator while a constant degree of opening of said gas flow rate regulator is maintained.

5. A process of producing a foamed plastic insulated conductor as set forth in claim 3, wherein a velocity of said foaming gas through said gas flow rate regulator is sonic or generally sonic.

6. A process of producing a foamed plastic insulated conductor as set forth in claim 4, wherein a velocity of said foaming gas through said gas flow rate regulator is sonic or generally sonic.

7. An apparatus for producing a foamed plastic insulated conductor comprising a gas injecting extruder to extrude a foamed resin insulation on a conductor wire travelling through a head thereof so as to cover said conductor wire with said foamed resin insulation; a gas flow rate regulator to determine a flow rate of a foaming gas to be injected into a molten resin in said gas foaming extruder; cooling trough means to cool said foamed insulation on said conductor wire, said cooling trough means including a movable trough which is movable axially of said foamed plastic insulated conductor toward and away from said head of said gas injecting extruder; a capacitance monitor to detect a value of a capacitance of said cooled and foamed plastic insulated conductor to be compared with a given or specified value thereof; and trough position adjusting means to adjust the position of said movable trough so as to eliminate a difference between said detected value and said given or specified one of said capacitance of said foamed plastic insulated conductor, characterized by further comprising trough position detecting means to electrically detect the positions of said movable trough adjacent to limit positions of the range of movement thereof; a gas flow rate regulator adjusting means to adjust said flow rate of said foaming gas to another value in accordance with an electrical signal from said trough position detecting means; and timer means to stop the adjustment of said gas flow rate regulator for a setting time after the adjustment of said gas flow rate regulator is completed.

8. An apparatus for producing a foamed plastic insulated conductor as set forth in claim 7, wherein said movable trough is provided with an operating member for operating first position detecting means to detect said limit positions of movement of said movable trough and second trough position detecting means to detect positions adjacent to said limit positions of said movable trough.

* * * * *